United States Patent
Gent et al.

(10) Patent No.: US 12,166,187 B1
(45) Date of Patent: Dec. 10, 2024

(54) METHOD FOR IMPROVING PERFORMANCE OF METAL CONVERSION BATTERIES AND METAL CONVERSION BATTERIES FORMED THEREFROM PRELIMINARY CLASS

(71) Applicant: Inlyte Energy, Inc., San Leandro, CA (US)

(72) Inventors: William Gent, San Leandro, CA (US); Antonio Baclig, San Leandro, CA (US); Roger Bull, Derby (GB); Stephen Brooker, Derby (GB); Roger Tilley, Ashbourne (GB); Roy Galloway, Derbyshire (GB)

(73) Assignee: Inlyte Energy, Inc., San Leandro, CA (US)

( * ) Notice: Subject to any disclaimer, the term of this patent is extended or adjusted under 35 U.S.C. 154(b) by 0 days.

(21) Appl. No.: 18/629,518

(22) Filed: Apr. 8, 2024

(51) Int. Cl.
*H02J 7/00* (2006.01)
*H01M 10/054* (2010.01)
*H01M 10/058* (2010.01)
*H01M 10/44* (2006.01)

(52) U.S. Cl.
CPC ....... *H01M 10/446* (2013.01); *H01M 10/054* (2013.01); *H01M 10/058* (2013.01); *H01M 10/443* (2013.01)

(58) Field of Classification Search
None
See application file for complete search history.

(56) References Cited

U.S. PATENT DOCUMENTS

| | | |
|---|---|---|
| 3,847,667 A | 11/1974 | Werth |
| 3,877,984 A | 4/1975 | Werth |
| 3,960,597 A | 6/1976 | Werth et al. |
| 4,546,055 A | 10/1985 | Coetzer et al. |
| 4,592,969 A | 6/1986 | Coetzer et al. |
| 4,722,875 A | 2/1988 | Wright |
| 4,797,333 A | 1/1989 | Coetzer et al. |
| 9,059,484 B2 | 6/2015 | Sudworth |
| 9,065,133 B2 | 6/2015 | Sudworth |
| 9,159,980 B2 | 10/2015 | Rijssenbeek et al. |
| 9,257,698 B2 | 2/2016 | Galloway et al. |
| 9,257,868 B2 | 2/2016 | Chuah et al. |
| 9,362,537 B2 | 6/2016 | Zappi et al. |
| 9,692,045 B2 | 6/2017 | Ramani et al. |
| 10,615,407 B2 | 4/2020 | Li et al. |
| 2010/0207570 A1* | 8/2010 | McWhorter .......... H01M 10/44 320/101 |
| 2011/0104563 A1 | 5/2011 | Galloway et al. |
| 2011/0206984 A1 | 8/2011 | Yerramalli et al. |
| 2012/0148924 A1* | 6/2012 | Ogino ............... H01M 10/0568 429/207 |
| 2012/0217933 A1* | 8/2012 | Abe .................... H01M 10/615 320/128 |
| 2013/0004828 A1 | 1/2013 | Zappi et al. |
| 2013/0040171 A1 | 2/2013 | Galloway |
| 2015/0004456 A1 | 1/2015 | Galloway et al. |
| 2015/0037645 A1 | 2/2015 | Ramani et al. |
| 2017/0104244 A1 | 4/2017 | Bull et al. |
| 2019/0115632 A1* | 4/2019 | Beuning ............. H02M 3/1582 |
| 2022/0393230 A1 | 12/2022 | Li et al. |

FOREIGN PATENT DOCUMENTS

| | | |
|---|---|---|
| GB | 2226692 B | 1/1993 |
| GB | 9526578 | 2/1996 |
| GB | 2304451 | 6/1998 |
| JP | 3054160 B2 | 6/2000 |
| WO | 9103080 A1 | 3/1991 |

OTHER PUBLICATIONS

"Battery Basics", Zebra Technologies, https://www.zebra.com/content/dam/zebra_new_ia/en-us/manuals/mobile-computers/battery-basics-faq-en.pdf, first downloaded Feb. 26, 2024.
"Collection of Phase Diagrams", https://www.crct.polymtl.ca/fact/phase_diagram.php?xlabel=&ylabel=&maxx=1&minx=0&maxy=850&miny=0&calc=1&file=FeCl2-NaCl.jpg&y=&cat=sa&dir=FTsalt&lang=&type=b&coords =?200,252, first downloaded Feb. 22, 2024.
"Molten-Salt Batteries: Pros and Cons of a 40-Year-Old "Innovation"", Flash Battery, https://www.flashbattery.tech/en/molten-salt-batteries-operation-and-limits/, first downloaded Apr. 1, 2024.
Dustmann, Cord-H. , "Advances in ZEBRA batteries", Journal of Power Sources, vol. 127, Issues 1-2, Mar. 10, 2004, pp. 85-92.
Johnstone, H. F. , et al., "The System Ferric Chloride-Sodium Chloride", The Ferric Chloride-Sodium Chloride System, Feb. 1942, vol. 64, pp. 241-244.
Lancashire, Robert J., "Redox Potentials for some first row transition metals ions", Chemistry, UWI-Mona, http://wwwchem.uwimona.edu.jm/courses/TMredox.html, created Jul. 2000, links checked and/or last modified Nov. 12, 2007, first downloaded Feb. 22, 2024.
Li, Minyuan M., et al., "A freeze-thaw molten salt battery for seasonal storage", Cell Reports Physical Science, 3, 100821, Apr. 20, 2022.
Li, Guosheng , et al., "An Advanced Na—FeCl2 ZEBRA Battery for Stationary Energy Storage Application", Adv. Energy Mater. 2015, 1500357.
Lu, Xiaochuan , et al., "Advanced materials for sodium-beta alumina batteries: Status, challenges and perspectives", Journal of Power Sources 195 (2010) 2431-2442, available online Dec. 2, 2009.

(Continued)

*Primary Examiner* — Arun C Williams
(74) *Attorney, Agent, or Firm* — Jeffrey Schox; Randy Mehlenbacher

(57) ABSTRACT

A method can include loading a battery with battery materials (e.g., electrolyte, cathode materials, anode materials), applying a first charge to the battery, applying a first discharge to the battery, cycling the battery (e.g., through subsequent charge and discharge cycles) where operating conditions in the subsequent charge and/or discharge cycles can be different from operating conditions in the first charge and/or first discharge.

23 Claims, 6 Drawing Sheets

(56) References Cited

OTHER PUBLICATIONS

Ruther, Rose E., et al., "Mechanically Robust, Sodium-Ion Conducting Membranes for Nonaqueous Redox Flow Batteries", CS Energy Lett. 2018, 3, 7, 1640-1647, Publication Date: Jun. 18, 2018, https://pubs.acs.org/doi/10.1021/acsenergylett.8b00680.

Spoerke, Erik D., et al., "Molten Sodium Batteries", Book, May 1, 2020, SAND2020-5319B, Sandia National Lab. (SNL-NM), Albuquerque, NM (United States),USDOE Office of Electricity (OE), DOE Contract No. AC04-94AL85000.

Sudworth, J.L., "The sodium/nickel chloride (ZEBRA) battery", Journal of Power Sources 100 (2001) 149-163.

Zhan, Xiaowen, et al., "A Low-Cost Durable Na—FeCl2 Battery with Ultrahigh Rate Capability", Adv. Energy Mater. 2020, 10, 1903472.

\* cited by examiner

Loading a battery with battery materials S100

Charging the battery a first time S200

Discharging the battery a first time S300

Cycling the battery through charging and discharging S400

METHOD FOR IMPROVING PERFORMANCE OF METAL CONVERSION BATTERIES AND METAL CONVERSION BATTERIES FORMED THEREFROM PRELIMINARY CLASS

STATEMENT OF GOVERNMENT SUPPORT

This invention was made with government support under ARPA-E Award No. DE-AR0001669 awarded by the Advanced Research Projects Agency-Energy (ARPA-E) Department of Energy. The government has certain rights in the invention.

TECHNICAL FIELD

This invention relates generally to the metal conversion battery field, and more specifically to a new and useful method in the metal conversion battery field.

BRIEF DESCRIPTION OF THE FIGURES

FIG. 1 is flowchart representation of an example of the method.

DETAILED DESCRIPTION

The following description of the embodiments of the invention is not intended to limit the invention to these embodiments, but rather to enable any person skilled in the art to make and use this invention.

1. Overview

As shown in FIG. 1, the method can include loading a battery case with battery materials S100, applying a first charge to the battery S200, applying a first discharge to the battery S300, cycling the battery (e.g., through charge and discharge cycles) S400. The method preferably functions to improve a capacity of the battery (total lifetime capacity, reduce amount of time necessary to achieve the target capacity, etc.). The battery is preferably a molten battery (e.g., molten salt such as sodium sulphur, lithium sulphur, sodium metal-halide, etc.; molten metal such as magnesium-antimony, lead-antimony, etc.; metal conversion; etc.). However, the method can be used with other battery chemistries.

2. Technical Advantages

Variants of the technology can confer one or more advantages over conventional technologies.

Figure 5:
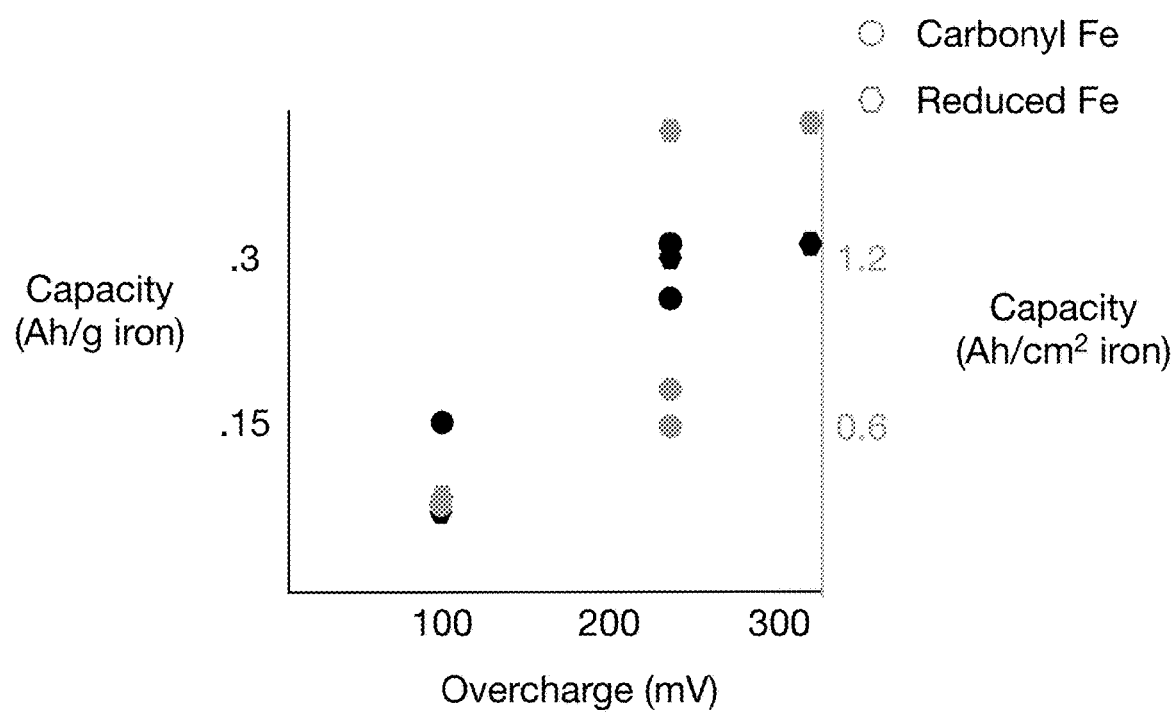
FIG. 5 is a graphical representation of examples of capacity (as a function of mass and surface area of iron) for sodium-iron(II) chloride batteries with first cycling (all maintained at about 325° C. for the entire first charge time) charging at different overcharge potentials and for different iron material sources.
Figure 6:
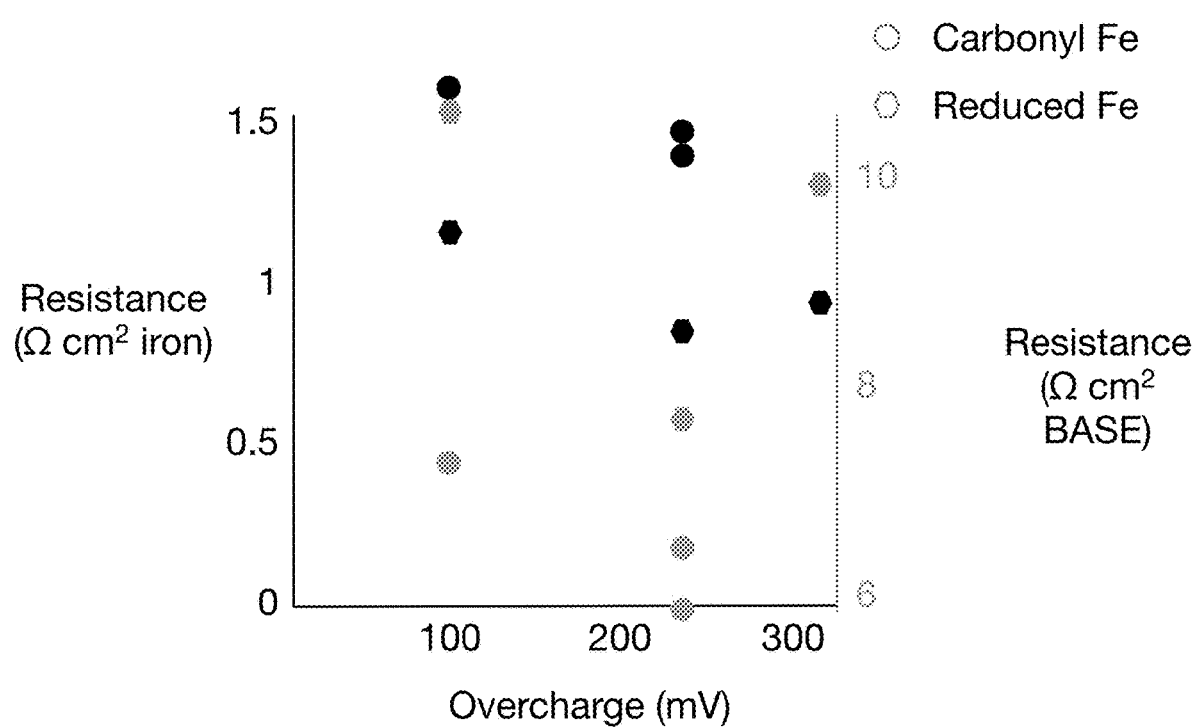
FIG. 6 is a graphical representation of examples of resistance (as a function of mass and area of iron) for sodium-iron (II) chloride batteries with first cycling (all maintained at about 325° C. for the entire first charge time) charging at different overcharge potentials and for different iron material sources. In these examples, the resistance was calculated as the average of the C/16.7 DC resistance at 1.5 Ah discharge and 5 Ah discharge, after a complete full charge.

First, variations of the technology that leverage an excess overpotential during the first charging cycle can result in improved battery capacity (without significantly impacting a calendar life and/or cycle life of the battery). As shown for example in FIG. 5, an overpotential (defined relative to an open circuit potential for a battery chemistry) of about 225 mV (e.g., 230 mV) during a first charging cycle can result in a greater battery capacity than an overpotential of about 100 mV (e.g., 110 mV). Additional overpotential (up to about 350 mV) has a modest increase in the battery capacity relative to about 225 mV overpotential, but can also result in increased battery resistance (as shown for example in FIG. 6).

Second, contrary to common knowledge, the inventors have discovered that maintaining a temperature of the battery at a higher temperature throughout an entire first charge, the battery can access much greater proportions of the battery's capacity (common knowledge in the field suggests that the higher temperature for extended periods of time would result in undesirable phase formation and thus hinder or reduce the battery performance). In extreme cases, batteries that are charged at a lower temperature for a first charge (e.g., 280° C., 250° C., 200° C., etc.) can only access about 10% of the theoretical battery capacity (after the first cycle) whereas batteries charged in a first cycle according to variations of the invention can access up to 90% of the theoretical battery capacity (e.g., after the first cycle). While in some variations the batteries charged at the lower temperature can eventually (e.g., after 2, 3, 5, 10, 20, 50, etc. cycles) access the full capacity, the results are challenging to reproduce and do not allow full access to the energy potential of the battery for the full calendar life of the battery (e.g., sacrifice battery capability without improving calendar life). Moreover, these variations can suffer from rapidly changing capacity and/or resistance in the early battery cycles resulting in challenges for the power electronics as most battery powered systems need to be matched to a relatively stable and predictable window of battery behaviour.

Third, variants of the technology can be used to form batteries that are beneficial for grid energy storage (e.g., leverage earth abundant materials such as oxygen, silicon, aluminium, iron, calcium, sodium, magnesium, potassium, titanium, hydrogen, phosphorus, manganese, fluorine, barium, strontium, sulfur, carbon, zirconium, chlorine, vanadium, chromium, rubidium, nickel, zinc, cerium, etc.; have long calendar life such as 5 year, 7 year, 10 year, 15 year, 20 year, 25 year, 30 year, 50 year, 100 year, etc. and/or cycle life such as achieving at least 100 cycles, 200 cycles, 500 cycles, 750 cycles, 1000 cycles, 1500 cycles, 2000 cycles, 2500 cycles, 3000 cycles, 4000 cycles, 5000 cycles, 6000 cycles, 7000 cycles, 7500 cycles, 8000 cycles, 9000 cycles, 10000 cycles, etc. without a reduction in capacity by more than about 10%; have high round-trip efficiency such as 75-90%; have low or no flame risk such as by including no flammable materials, no organic solvents, no combustible materials, etc.; have high energy density such as volumetric energy density 150 Wh/L, 200 Wh/L, 250 Wh/L, 275 Wh/L, 280 Wh/L, 290 Wh/L, 300 Wh/L, 400 Wh/L, 500 Wh/L, etc. and/or specific energy density 100 Wh/kg, 150 Wh/kg, 175 Wh/kg, 200 Wh/kg, 215 Wh/kg, 225 Wh/kg, 250 Wh/kg, 300 Wh/kg, 500 Wh/kg; etc.). For example, the batteries can leverage metal conversion battery chemistries (e.g., sodium-iron chloride chemistry).

Fourth, variants of the technology can achieve the improvements without including (e.g., including less than 5%, 4%, 2%, 1%, 0.5%, 0.1%, etc.; excluding; etc.) additives (e.g., reducing agents) to react with the cathode metal (e.g., reduce oxide on a surface of the material). For instance, examples of the technology can exclude sulfur (whose inclusion may improve initial capacity of the battery at the expense of the calendar life of the battery and/or its ability to safely tolerate elevated temperatures such as >390° C. without loss of structural integrity of the battery case).

Figure 4:
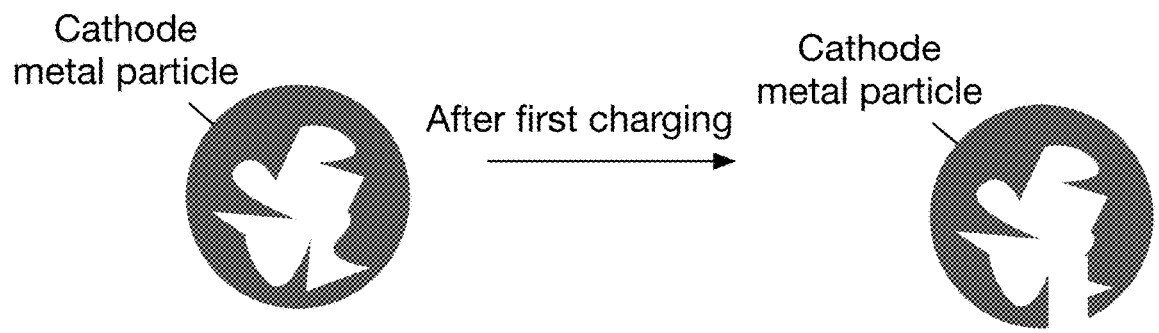
FIG. 4 is a schematic representation of an example of an iron particle with trapped surface area before charging and that surface area released after discharging.

Fifth, variants of the technology can enable lower cost materials to be used for the battery manufacture. For instance, iron sources have lower specific surface area than nickel sources, however, examples of the technology can enable similar relative performance between batteries leveraging iron sources. Relatedly, variants of the technology can enable iron sources with low specific surface areas to achieve (or in some cases exceed) performance for batteries made using higher surface area iron sources (see for instance FIG. 5 or FIG. 6 where circles show carbonyl iron which has a specific surface area prior to first charging of about 0.4-0.5 $m^2$/g and hexagons show reduced iron which has a specific surface area prior to first charging of about 0.15-0.25 $m^2$/g). Without being tied to one theory, the inventors believe this improved performance may be a result of trapped surface area within the particles become accessible during or as a result of the first charging process (as shown schematically for example in FIG. 4).

However, further advantages can be provided by the system and method disclosed herein.

3. Energy Storage Device

An energy storage device 10 can include a housing, cathode, anode, electrolyte (e.g., solid electrolyte, secondary electrolyte, etc.), and/or any suitable materials and/or components. The energy storage device is preferably a battery. However, the energy storage device can additionally or alternatively include a capacitor, supercapacitor, fuel cell, and/or other suitable device. The battery is preferably a metal conversion battery (e.g., sodium sulphur, lithium sulphur, sodium metal-halide, etc.). However, the battery can additionally or alternatively include other suitable battery chemistry (e.g., metal-alloy batteries such as magnesium-antimony, lead-antimony, etc.).

The cathode (during discharge) functions to reduce a material (e.g., cathode active material) thereby providing electrons to an external load. The cathode active material is preferably stored within a cathode chamber of the battery housing, where the cathode chamber is separated from an anode chamber by a separator and/or solid electrolyte. However, the cathode active material can be otherwise be disposed or arranged.

The cathode active material is preferably iron based (which can be beneficial as iron is an earth abundant material). However, the cathode active material can additionally or alternatively be based on (e.g., include, use, etc.) other metals with suitable electroreactivity (e.g., nickel, copper, manganese, vanadium, titanium, cobalt, chromium, zinc, aluminium, etc.). As a specific example, a cathode active material can include a mixture of iron and nickel in a ratio (e.g., mass ratio, atomic ratio, etc.) of between about 8:2 (e.g., about 80% Fe and about 20% Ni) and 100:1 (e.g., essentially entirely composed of, consisting essentially of, including essentially only, etc. iron). However, other suitable mixtures or combinations can be achieved.

The anode (during discharge) functions to oxidize a material (e.g., anode active material) thereby completing an electrical circuit to enable the energy storage device to power a load. The anode active material is preferably stored within an anode chamber of the battery housing, where the anode chamber is separated from the cathode chamber by a separator and/or solid electrolyte. However, the anode active material can be otherwise be disposed or arranged.

The anode active material is preferably an alkali metal-based material (e.g., a material that includes one or more of lithium, sodium, potassium, rubidium, and/or cesium). As a specific example, the anode active material can include (e.g., consist of, be composed of, consist essentially of, be composed essentially of, etc.) sodium (which can be beneficial as sodium is an earth abundant material). However, other suitable anode active materials can be used (e.g., alkaline earth metals, metalloids, etc.).

Typically, the energy storage device is anode active material limited (e.g., includes excess atomic percentage of cathode active material compared to anode active material). However, the energy storage device can be cathode active material limited and/or include identical amounts of anode active material and cathode active material. For instance, in a fully discharged state, the energy storage device can include sodium chloride and iron (or mixtures of iron and other materials) and in a fully charged state, the energy storage device can include sodium (e.g., molten sodium), iron (II) chloride, and iron (e.g., as there is excess iron relative to sodium). However, the energy storage device can include any suitable materials in any state.

Between charging and discharging, the battery storage device can include other phases of material (e.g., $Na_6FeCl_8$). Relatedly, during charging and/or discharging, other phases of material are preferably not formed. Undesirable phases can include phases with average iron oxidation states exceeding 2 such as $FeCl_3$ (and/or mixtures of $FeCl_2$ and $FeCl_3$), clusters (e.g., $Fe_2Cl_4$, $Fe_2Cl_5$, $Fe_3Cl_6$, etc.), and/or other phases (such as related materials including alkali metals like $Na_2FeCl_4$ and $NaFeCl_4$). In a specific example, the amount of undesirable phases present in the energy storage device is preferably less than about 5% (e.g., by mass, by stoichiometry, etc.) of the composition of active material. However, any suitable amount of undesirable phases can be included. In some variants, the presence of a small amount of the undesirable phase (e.g., ≤5%, ≤4%, ≤2.5%, ≤1%, ≤0.5%, ≤0.1%, etc. where percentage can be a mass percentage, stoichiometric percentage, etc.) can contribute to (e.g., improve a stability of) the active material (e.g., by decreasing particle degradation, by slowing or preventing Ostwald ripening, by passivating a surface, etc.). The phases can be measured using any suitable diffraction (e.g., neutron diffraction, electron diffraction, x-ray diffraction, etc.), direct imaging (e.g., scanning electron micrography, transmission electron micrography, etc.), spectroscopy (e.g., vibrational spectroscopy, electronic spectroscopy, nuclear spectroscopy, etc.), titration, and/or other suitable analytic technique (typically, but not exclusively, performed on a disassembled cell).

The electrolyte preferably functions to facilitate transport of active ions between the cathode and the anode while hindering the transport of electrons (e.g., the electrolyte preferably has a high ionic conductivity and a low electronic conductivity). In some variants, the electrolyte can additionally or alternatively function as a separator, act as an overcharge protector, extend a lifetime (cycle life, calendar life, etc.) of the energy storage device, and/or can otherwise function. The electrolyte can include solid electrolyte, liquid electrolyte (e.g., molten salt electrolyte), and/or any suitable electrolyte component(s).

The solid electrolyte is preferably β-alumina (e.g., more accurately a polyaluminate with a cation to match a mobile ion such as sodium, potassium, thallium, ammonium, hydronium, etc. such as a sodium polyaluminate with a chemical formula $Na_{1+x}Al_{11}O_{17+x/2}$ for $0 \leq x \leq 0.57$, a doped sodium polyaluminate such as including iron doping, lithium doping, magnesium doping, etc.) solid electrolyte (BASE). The BASE can be β-alumina (e.g., β-alumina with hexagonal symmetry and a unit cell with two spinal blocks and two adjacent conduction planes), β"-alumina (e.g., β-alumina with rhombohedral symmetry and a unit cell with three spinal blocks and adjacent conduction planes), and/or other suitable β-alumina structures can be used (e.g., doped β-alumina). However, additional or alternative solid electrolytes can include: NASICON materials (e.g., sodium super ionic conductors such as $Na_{1+x}Zr_2Si_xP_{3-x}O_{12}$ $0 \leq X \leq 3$ or other related materials such as with Na, Zr, and/or Si replaced with isovalent elements; NASIGLAS; $Na_4Zr_2Si_3O_{12}$; etc.), sodium conducting membranes (e.g., poly(ethylene oxide) plasticized with tetraethylene glycol dimethyl ether and/or sodium triflate or other sodium salts), and/or other suitable solid electrolytes.

In some variants, the solid electrolyte can include (e.g., be coated with) an additive to improve wettability to electrode material (e.g., molten sodium). For instance, carbon powder can be used to improve the wettability and/or wicking of the electrode material.

The secondary electrolyte is preferably an aluminate (e.g., tetrachloroaluminate) and/or other aluminium containing material. For example, the secondary electrolyte can include sodium aluminium chloride (e.g., $NaAlCl_4$, $NaAl_2Cl_7$, etc.), sodium aluminium bromide ($NaAlBr_4$), sodium aluminium iodide ($NaAlI_4$), sodium aluminium ethyl chloride (e.g., $NaAl(C_2H_5)Cl_3$), combinations thereof, and/or other suitable aluminates. However, the secondary electrolyte can additionally or alternatively include any suitable species.

The housing preferably functions to contain the cathode (e.g., cathode active material) and anode (e.g., anode active material) such as to separate or isolate the electrodes from an external environment (e.g., hinder or prevent water ingress from an environment into the interior of the battery such as to prevent formation of hydrates). The housing can additionally or alternatively function as a current collector (and/or the housing can include a current collector such as a current collector for the anode and a current collector for the cathode) and/or can otherwise function. The housing is typically made of stainless steel (e.g., nickel-coated stainless steel, iron coated stainless steel, etc.). However, other suitable materials can be used (e.g., aluminium, copper, etc.). Typically, a cylindrical housing assembly is used (also referred to as canular). However, other suitable shapes can be realized (e.g., prismatic, spheroidal, spherocylindrical, conical, tetrahedral, etc.). Within the housing, the anode chamber, cathode chamber, solid electrolyte, and/or other compartments and/or components are typically symmetrically arranged within the housing (e.g., rotationally symmetric such as with a 2, 3, 4, 5, 6, 7, 8, etc. fold rotation symmetry; reflectional symmetry; inversion symmetry; helical symmetry; retroreflection symmetry; etc.). However, the components can be arranged in an asymmetric manner.

During operation (e.g., to enable transport of ions, during cycling, etc.), the energy storage device is typically maintained at an elevated temperature. The elevated temperature can be a temperature greater than a melting point of an active material (e.g., anode active material), greater than a melting point of a secondary electrolyte, a temperature to promote wetting of molten material on the solid electrolyte, less than a boiling temperature of an active material and/or secondary electrolyte, less than a phase transition temperature for an active material (e.g., cathode active material, anode active material, etc. in either charged or discharged state), and/or another suitable temperature. As an illustrative example, for a battery that uses sodium (e.g., for the anode, mobile ion, etc.), the battery can be operated at a temperature greater than about 97.794° C. (e.g., 100° C., 150° C., 190° C., 200° C., 250° C., 265° C., 275° C., 280° C., 285° C., 290° C., 300° C., 350° C., 400° C., values or ranges therebetween, etc.). In a variation of this illustrative example, a battery that includes sodium tetrachloroaluminate as a secondary electrolyte can be operated at a temperature greater than about 157° C. (e.g., 175° C., 190° C., 200° C., 250° C., 265° C., 275° C., 280° C., 285° C., 290° C., 300° C., 325° C., 350° C., 400° C., values or ranges therebetween, etc.). In another variation of this illustrative example (or its variations), a battery that includes iron chloride (e.g., as cathode active material), the battery can be operated (e.g., during continuous operation) at a temperature less than about 350° (e.g., 100° C., 150° C., 175° C., 190° C., 200° C., 250° C., 265° C., 275° C., 280° C., 285° C., 290° C., 300° C., 325° C., values or ranges therebetween, etc.) to hinder or prevent formation of undesirable phases. As used herein, temperature typically refers to an average and/or target (e.g., set) temperature where variations in temperature can occur (e.g., variations between cells, variations within a cell, etc.). The variations in temperature are typically less than about 40° C. (e.g., ±40° relative to the average temperature). However, greater variations can be accounted for.

In some variations, the energy storage device can be shut down or stored for extended periods of time (e.g., days, weeks, months, years, etc.) by cooling the energy storage device to a temperature below the operating temperature. After such a period of time, the energy storage device is preferably restarted by performing a new first cycling of the energy storage device (e.g., as described below). However, the energy storage device could additionally or alternatively be restarted by bringing that energy storage device into the same or similar operating conditions as its desired operating conditions (e.g., heating to the operating temperature, allowing the energy storage system to equilibrate at the operating temperature, etc.) and/or can otherwise be restarted.

An illustrative example of an energy storage device is a sodium-iron chloride battery. In this illustrative example, the electrochemical reaction from discharging to charging $NaCl + \frac{1}{2} Fe \leftrightarrow Na + FeCl_2$, where the sodium (e.g., from a molten sodium anode) can migrate through a BASE (or other solid electrolyte or separator) to facilitate the reaction. The standard electrode potential of this cell is approximately 2.49 V. When this cell is operated at elevated temperature (e.g., 250° C.) the standard cell potential is reduced (e.g., according to the Nernst equation) to about 2.35V. These cells can be operated at a temperature between 180-200° C. to limit the dissolution of iron (II) chloride in sodium chloride, to hinder the formation of undesirable phases, and/or to minimize Ostwald ripening of iron particles; however the inventors have found that operation can proceed at greater temperatures (e.g., 250° C.) for extended periods of time with little or no impact on the battery performance (e.g., without significantly impacting cycle life). In variations of this example, the cathode can include nickel (e.g., to improve electrical conductivity within the cathode), where typically the nickel will not undergo electrochemical reactions. For instance, the cathode can include about 1-20% nickel and about 80-99% iron (percent by weight of raw material included, atomic percentage, etc.). Variations of this example can include a secondary electrolyte (e.g., sodium tetrachloroaluminate) which can function to improve sodium conductivity within the cathode, can function to repair damage in the BASE, and/or can otherwise function. However, the battery can have any suitable materials.

A capacity (e.g., charge capacity after a first charging cycle) of the battery (e.g., a battery as treated according to the method below) is typically between about 5 and 500 Ah (e.g., 5 Ah, 10 Ah, 15 Ah, 20 Ah, 25 Ah, 50 Ah, 100 Ah, 150 Ah, 200 Ah, 250 Ah, 300 Ah, 400 Ah, 500 Ah, values or ranges therebetween, etc.). However, the capacity can depend on the battery chemistry, anode active material, cathode active material, amount of active material, battery size, and/or other suitable conditions. The normalized capacity (e.g., normalized for the amount of metal in the battery) is typically between 0.01 and 0.5 Ah/(g metal) (e.g., 0.02, 0.03, 0.05, 0.07, 0.1, 0.12, 0.14, 0.15, 0.17, 0.2, 0.21, 0.22, 0.24, 0.26, 0.28, 0.3, 0.31, 0.33, 0.35, 0.37, 0.39, 0.4, 0.42, 0.44, 0.46, 0.48, 0.5, values or ranges therebetween, etc.). The normalized capacity (e.g., normalized for the surface area of metal as added in the battery) is typically between 0.01 and 0.5 mAh/($cm^2$ of exposed metal surface area) (e.g., 0.02, 0.03, 0.035, 0.05, 0.06, 0.07, 0.1, 0.12, 0.14, 0.15, 0.16, 0.17, 0.2, 0.21, 0.22, 0.24, 0.26, 0.28, 0.3, 0.31, 0.33, 0.35, 0.37, 0.39, 0.4, 0.42, 0.44, 0.46, 0.48, 0.5, values or ranges therebetween, etc.). However, the capacity can otherwise be normalized. The use of normalized capacity (e.g., normalized for amount of iron, iron surface area, etc.) can facilitate comparison between different batteries.

A resistance (e.g., measured at 1 Ah discharge, 1.5 Ah discharge, 2 Ah discharge, 2.5 Ah discharge, 3 Ah discharge, 4 Ah discharge, 5 Ah discharge, etc. at about a $1/15$ A/(Ah theoretical capacity) current such as during the first discharge, second discharge, third discharge, fifth discharge, tenth discharge, twentieth discharge, fiftieth discharge, hundredth discharge, thousandth discharge, ten thousandth discharge, etc.) of the battery is typically between about 1 and 50 mΩ (e.g., 1, 2, 3, 4, 5, 6, 7, 8, 9, 10, 12, 13, 16, 17, 19, 20, 21, 22, 23, 26, 28, 30, 32, 34, 38, 39, 40, 41, 44, 45, 47, 49, etc.). A normalized resistance of the battery (e.g., normalized for surface area of metal added to the battery) is typically between about 1 and 50 kΩ-($cm^2$ of exposed metal surface area) (e.g., 2, 3, 3.5, 5, 6, 7, 10, 12, 14, 15, 16, 17, 20, 21, 22, 24, 26, 28, 30, 31, 33, 35, 37, 39, 40, 42, 44, 46, 48, 50, values or ranges therebetween, etc.). A normalized resistance of the battery (e.g., normalized for surface area of solid electrolyte, BASE, etc. of the battery) is typically between about 1 and 20 Ω-($cm^2$ solid electrolyte surface area) (e.g., 1, 1.2, 1.4, 1.5, 1.6, 1.7, 2, 2.1, 2.2, 2.4, 2.6, 2.8, 3, 3.1, 3.3, 3.5, 3.7, 3.9, 4, 4.2, 4.4, 4.6, 4.8, 5, 5.1, 5.3, 5.7, 5.9, 6.1, 6.6, 6.8, 7, 7.2, 7.3, 7.6, 8, 8.3, 8.5, 8.9, 9, 9.1, 9.4, 9.9, 10, 10.5, 11, 12, 14, 15, 17, 18, 20, values or ranges therebetween, etc.). A normalized resistance of the battery (e.g., normalized for the full theoretical cell capacity) is typically between about 0.1 and 5 Ω-(Ah of theoretical capacity) (e.g., 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.3, 2.5, 2.7, 2.9, 3, 3.2, 3.4, 3.6, 3.8, 4, 4.2, 4.4, 4.6, 4.8, 5, values or ranges therebetween, etc.). However, the resistance can otherwise be normalized. The use of normalized resistance (e.g., iron surface area, solid electrolyte surface area, etc.) can facilitate comparison between different batteries. In some variants, an average resistance (e.g., averaged across different discharge rates, across different discharge cycles, across different starting state of charge, etc.) can be used. For example, the resistance can be calculated as the average of the C/16.7 DC resistance at 1.5 Ah discharge and 5 Ah discharge, after a complete full charge.

4. Method

As shown in FIG. 1, the method can include loading (and sealing) a battery case with battery materials S100, applying a first charge to the battery S200, applying a first discharge to the battery S300, cycling the battery (e.g., through charge and discharge cycles) S400. The method preferably functions to improve a capacity of the battery (e.g., first discharge capacity, maximum achievable capacity, total lifetime capacity, reduce amount of time necessary to achieve the target capacity, etc.). The battery is preferably a metal conversion battery (e.g., molten salt such as sodium sulphur, lithium sulphur, sodium metal-halide, etc.; metal alloy such as magnesium-antimony, lead-antimony, etc.; etc.). However, the method can be used with other battery chemistries. For example, the method can be performed using any suitable energy storage device as described above.

The method is typically performed once for an energy storage device (e.g., for a first charge and/or discharge cycle of the energy storage device). However, the method can be performed a plurality of times (e.g., upon start-up, after a shut down, after a prolonged period of disuse, to reset or replenish the energy storage device such as according to a maintenance schedule, etc.).

The method steps are typically applied contemporaneously (e.g., simultaneously, concurrently, etc.) for each battery cell in a battery pack and/or battery module. The specific step parameters (e.g., overpotential, temperature, duration, charging or discharging rate, etc.) can vary for different battery cells and/or be the same for each battery cell. As an illustrative example of different step parameters, different battery cells within a battery pack can have variability in temperature resulting in variable overpotentials being applied (as the standard battery cell electric potential depends on the temperature).

In some variants, the method (or portions thereof) may be performed continuously (e.g., parameters of S200 can be maintained for continued operation of the energy storage device without switching to operation parameters such as in S400). These variants may result in reduced lifetimes, but can provide an advantage of improved performance (e.g., specific energy density, volumetric energy density, capacity, etc.) of the energy storage device.

While the term battery is used, a person of skill in the art can recognize that other energy storage devices (e.g., capacitor, supercapacitor, fuel cell, etc.) could be realized by variants of this method.

Loading a battery case with battery materials S100 functions to incorporate one or more battery materials within a housing (e.g., a battery case). The battery materials are typically loaded in a discharged state (e.g., as this state is typically easier to handle, safer, less prone to reaction upon exposure to atmosphere, etc.). However, the battery materials can be loaded in a charged state, in a mixture of states (e.g., some materials can be in a charged state and others in a discharged state), and/or the battery materials can be added in any suitable state.

The battery materials can be added in a solid phase (as shown for example in FIG. 2A), one or more battery material can be added in a liquid phase (as shown for example in FIG. 2B where secondary electrolyte is added in the liquid phase), and/or other suitable phase (e.g., a solution, colloid, mixture, etc. of one material in a solid phase suspended in a liquid phase of another material).

The battery materials are usually added to the cathode region of the battery (e.g., into an enclosed volume defined by a solid electrolyte such as BASE). However, the battery materials can be added into any suitable region of the battery and/or housing.

The battery materials can include: cathode active material, anode active material, electrolyte (e.g., secondary electrolyte), additives (e.g., performance additives, wettability additives, etc. where additives can be at most about 20% such as 20.5%, 15%, 10%, 7.5%, 5%, 3%, 2%, 1%, 0.5%, 0.1%, etc. of the total materials added where percentage can be by weight, by volume, by stoichiometry, etc.), and/or any suitable materials can be included.

The cathode active material preferably includes one or more metals. In particular, the cathode active material preferably includes iron (e.g., because of its abundance, cost, electrochemical properties, etc.). However, the cathode active material can additionally or alternatively include other suitable materials (e.g., (electro)reactive materials, conductive additives, binder, additives, etc. such as nickel). The metal(s) (e.g., iron, nickel, etc.) are preferably particulate (e.g., includes particles). However, the metal(s) (e.g., iron, nickel) can additionally or alternatively be flakes, scrapes, foams, meshes, wires, and/or have other suitable morphology. The particles typically have a characteristic size (e.g., D10 size, D50 size, D90 size, radius, diameter, longest extent, shortest extent, etc.) between about 1 and 100 μm. However, smaller and/or larger particles can be used (e.g., ≤1 μm, ≥100 μm). The particles are typically spheroidal. However, the particles can have other morphologies (e.g., spherules, angular fractured grains, fiber, prismatic, irregular shapes, erupted particles, etc.). The particle surface area (as determined from calculation based on particle imaging, BET isotherm, gas permeability, mercury intrusion porosimetry, etc.) for iron (e.g., as loaded) is typically between about 0.05 and 0.5 $m^2/g$ (e.g., 0.05, 0.06, 0.07, 0.08, 0.09, 0.1, 0.11, 0.12, 0.14, 0.15, 0.18, 0.19, 0.2, 0.25, 0.27, 0.3, 0.33, 0.36, 0.4, 0.41, 0.42, 0.44, 0.45, 0.47, 0.51, values or ranges therebetween, etc.). The particle surface area (as determined from calculation based on particle imaging, BET isotherm, gas permeability, mercury intrusion porosimetry, etc.) for nickel is typically between about 0.4 and 2 $m^2/g$ (e.g., 0.5, 0.6, 0.8, 0.9, 1, 1.1, 1.2, 1.4, 1.5, 1.7, 1.8, 1.9, values or ranges therebetween, etc.). Because of this surface area difference, the method is typically found to have the most benefit for energy storage devices that utilize iron as the electroreactive metal. However, the method can be beneficial for nickel-based energy storage devices (particularly for nickel materials that start with a smaller surface area more comparable to that of the iron particles).

In some variants, the metal(s) are believed to have a significant internal surface area in addition to the external (e.g., exposed, directly measurable, etc.) surface area (e.g., hollow, internally structured, faceted, containing trapped porosity, etc.). In these variants, subsequent steps of the method can expose the internal surface area thereby increasing a surface area of the particles (as shown schematically for instance in FIG. 4). The difference in surface area before and after subsequent measurement steps and/or between an internal and external surface area can be determined by: comparing the surface area as measured before and after performing the steps, etching the external surface of the metal (e.g., chemical etching such as using acid, salt, alkali, etc.; plasma etching; focused ion beam (FIB); etc.), and/or in any suitable manner.

The iron can include carbonyl iron, direct reduced iron (e.g., sponge iron), meteoric iron, telluric iron, electrolytic iron, oxidizing pig iron (e.g., to remove carbon from the iron), reduced iron ore, and/or other suitable iron sources can be used. The nickel can include extractive nickel (e.g., nickel formed from roasting and reduction of nickel ore), electrorefined nickel, Mond process nickel (e.g., carbonyl nickel, nickel carbonyl decomposition, etc.), and/or via any suitable process. Other metal(s) can be formed in similar manner(s).

The metal(s) are preferably added in a neutral oxidation state (e.g., $Fe°$, $Ni°$, etc.). However, the metal(s) can be added in an oxidized state (e.g., as an iron salt such as $FeCl_2$, $FeCl_3$, $NiCl_2$, etc.), as an alloy (e.g., FeNi alloy), and/or in any suitable oxidation state or combination.

The metal(s) are preferably loaded as received (e.g., as synthesized, purchased, etc.). For example, the metal(s) are preferably loaded without performing additional processing steps on the metal(s). This can be beneficial for reducing time and/or cost of forming the battery, for improving consistency between batteries, and/or can otherwise be beneficial. However, processing steps could be performed on the metal(s) (e.g., comminution, washing, reducing an oxide layer, forming an oxide layer, etc.) prior to and/or during loading of the metal(s).

The anode active material is preferably alkali metal-based. For instance, the anode active material can include lithium, sodium, potassium, rubidium, cesium, and/or alloys thereof. However, the anode active material can additionally or alternatively include other suitable materials (e.g., with a suitable electronegativity and/or standard electrode potential difference relative to the cathode material; favorable melting temperature such as gallium, indium, tin, etc.; conductive additives; binder; additives; etc.).

The anode active material is preferably loaded as a precursor salt (e.g., NaCl, KCl, RbCl, CsCl, NaBr, KBr, RbBr, CsBr, NaI, KI, RbI, CsI, etc.) in the cathode chamber. However, the anode active material can be loaded as a metal (e.g., solid metal, liquid metal, etc.) and/or alloy (e.g., solid alloy, liquid alloy, etc.) in the anode chamber, as a salt with the cathode material (e.g., in a partially charged state such as $Na_6FeCl_8$) in the cathode chamber, as a salt with an electrolyte material (e.g., $NaAlCl_4$) in the cathode chamber, and/or in any suitable manner.

Typically, an excess of cathode active material relative to anode active material is used to ensure a conductive metal network remains in the cathode at the end of charge and thereby minimize the cell resistance and/or minimize or reduce a risk of electrochemical reactions forming chlorine (e.g., at least 2×, 3×, 5×, 10×, 20×, etc. stoichiometric amounts of cathode active material relative to anode active material and/or electrolyte). However, stoichiometric amounts of cathode active material and anode active material can be used, and/or excess anode active material can be used.

Figure 2A:
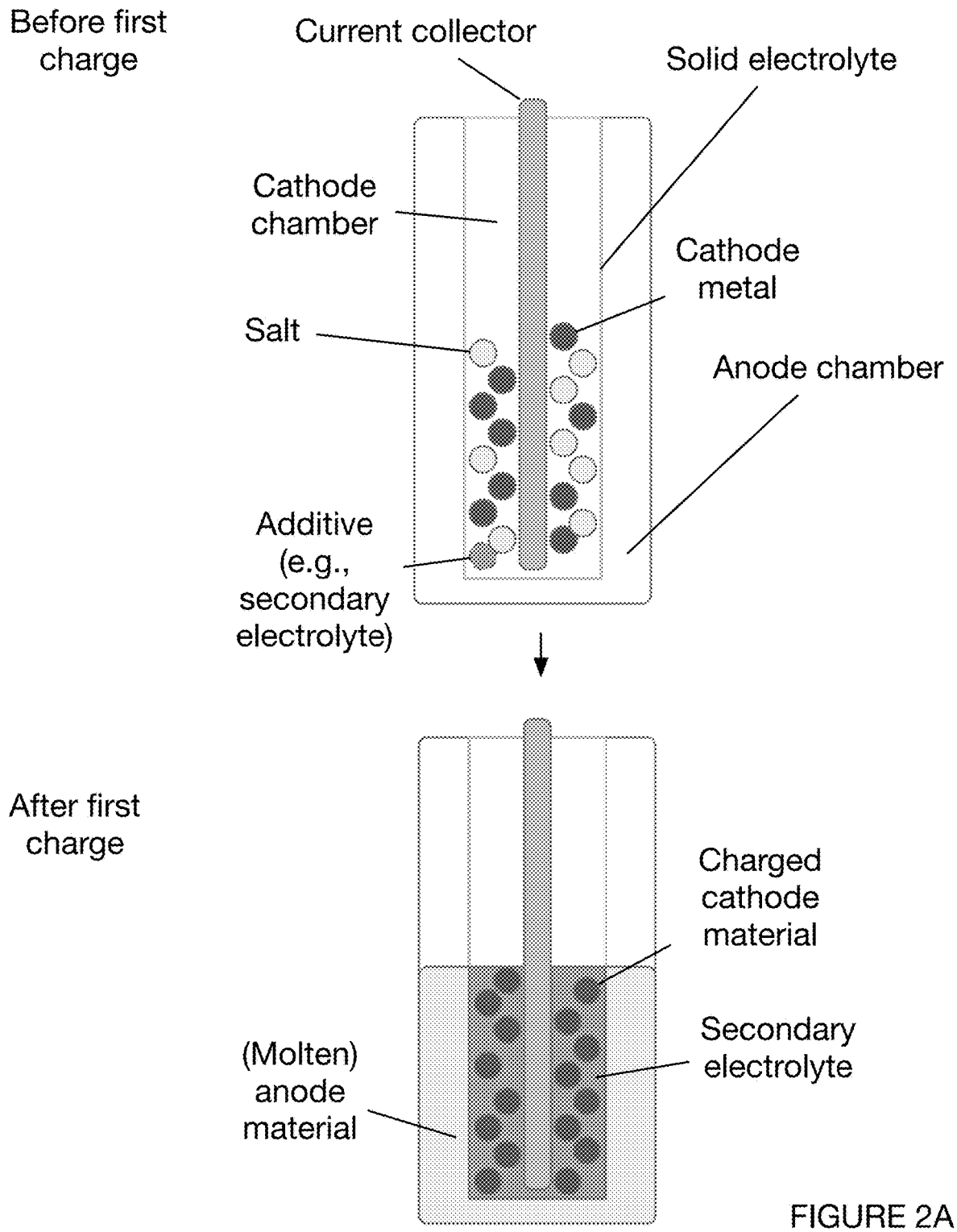
FIGS. 2A and 2B are schematic representations of examples of material components prior to and subsequent to an initial metal conversion battery charge.
Figure 2B:
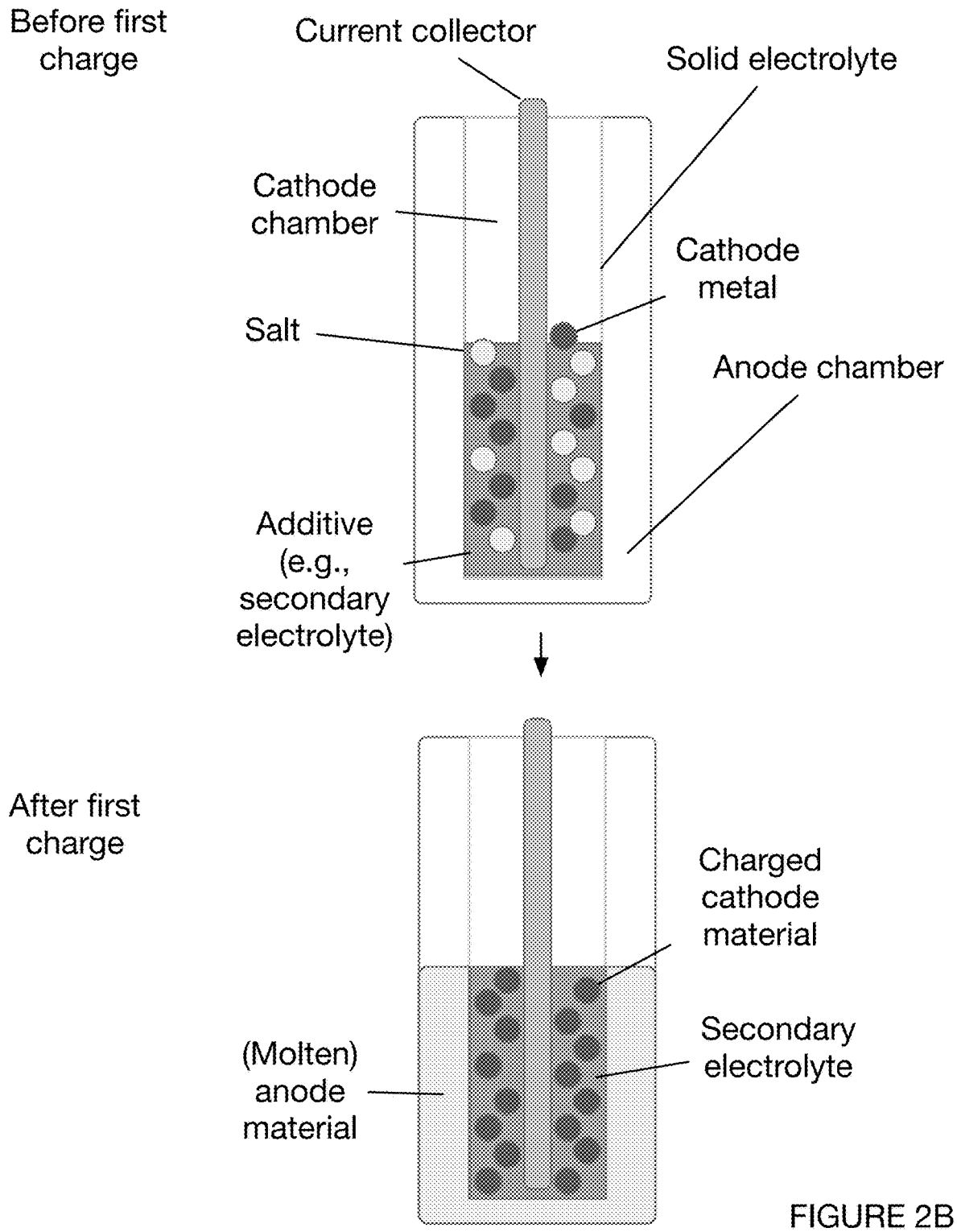

In variants that include a secondary electrolyte, the secondary electrolyte can be loaded as a metal (e.g., where the metal undergoes an electrochemical reaction to form the secondary electrolyte during charging), as a salt (e.g., preformed, a salt that undergoes a reaction to form the secondary electrolyte, as shown for example in FIG. 2A, etc.), as a liquid (as shown for example in FIG. 2B), and/or in any suitable form (e.g., as a compound with either or both of the anode active material and/or cathode active material). For example, for a battery that includes sodium tetrachloroaluminate (and/or other substituted halogens), the secondary electrolyte can be added as a secondary electrolyte precursor such as aluminium metal (e.g., which can be oxidized by sodium chloride to form the secondary electrolyte) and/or aluminium chloride (which can then form the secondary electrolyte through reaction with sodium chloride). However, any suitable secondary electrolyte precursor can be used.

The solid electrolyte (and/or separator) is typically shaped and loaded into the battery case (e.g., prior to loading other materials). However, the solid electrolyte can be added as precursor(s) which can then be reacted to form the solid electrolyte and/or can be added in any suitable form.

Applying a first charge to the battery S200 functions to charge the battery (e.g., store electrochemical potential in the battery). S200 is performed after S100, particularly when the battery materials are loaded in a discharged or not fully charged state (e.g., at less than 100% charge). For instance, any time an anode active material is added as a salt in the cathode chamber, S200 can be performed (e.g., until all of the salt is reduced and/or reacted). S200 is typically only performed once for a battery (e.g., a battery is only charged according to S200 one time). However, S200 can be performed a plurality of times (e.g., the conditions of S200 can be repeated for a second, third, etc. charging cycle; S200 can be performed after a system shutdown such as a battery cooling to a temperature below a material melting point, etc.), can be performed as part of maintaining a battery, as part of battery pack balancing (e.g., for one or more cell of a pack of batteries), and/or with any timing. S200 can be particularly beneficial for accessing a greater amount of (e.g., at least 70%, 75%, 80%, 85%, 90%, 95%, 97%, 99%, 99.5%, 99.9%, 100%, values or ranges therebetween) the expected capacity of a battery after a single charge (e.g., rather than a plurality of charges and/or not accessing the capacity) and/or for resulting in lower resistance. However, S200 can otherwise be beneficial.

Figure 3:
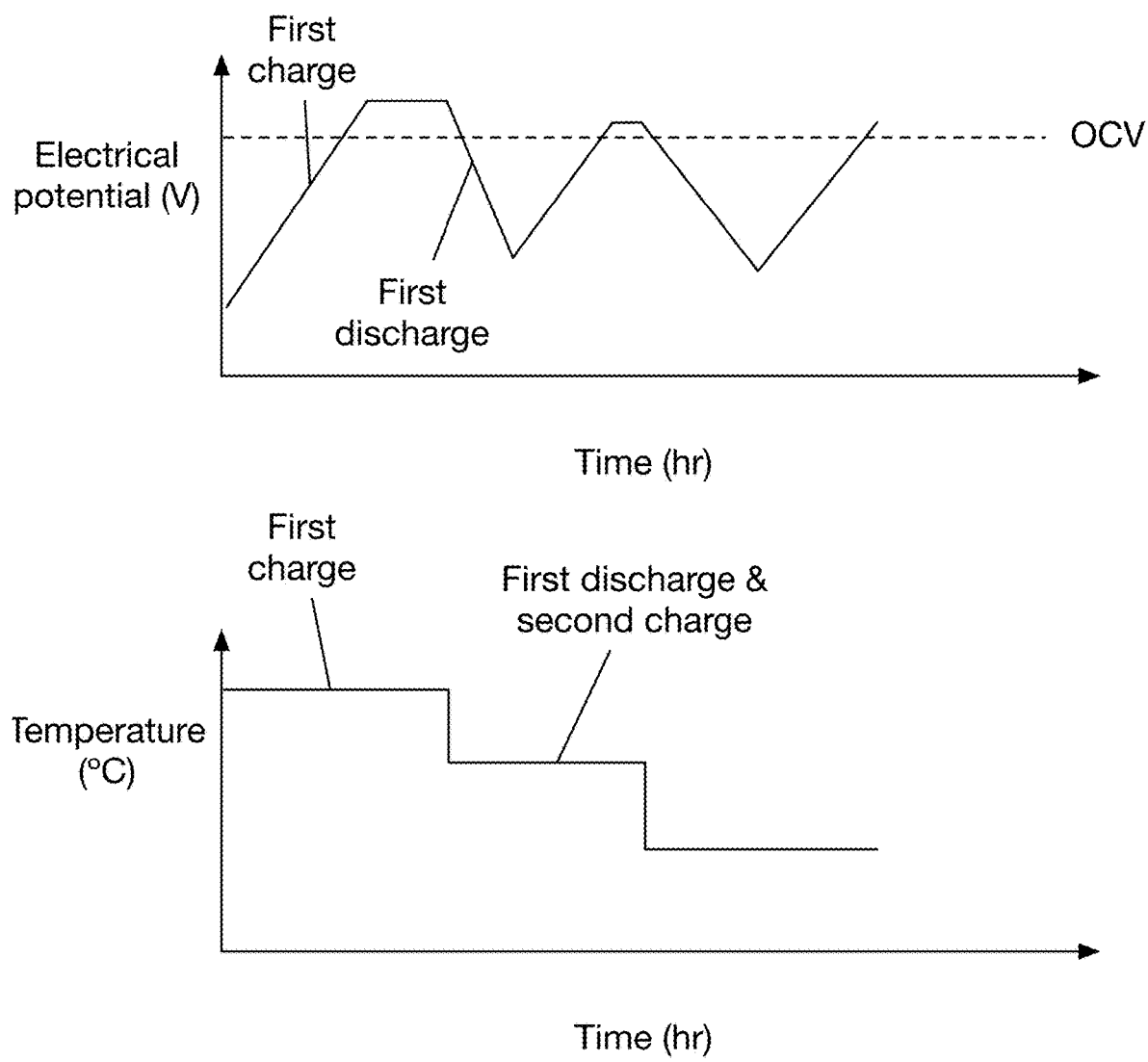
FIG. 3 is a graphical representation of examples of cycling (e.g., charging and discharging) profiles for a metal conversion battery for electrical potential as a function of time and temperature as a function of time (with labels for the first charge and first discharge explicitly shown and subsequent periods implicit).

S200 preferably includes maintaining the battery at or above a threshold electrical potential for a portion of the first cycle charging time (e.g., first cycle duration). The portion of the first cycle charging time is typically between about 10 and 90% of the duration of the first charging cycle (as shown for instance in FIG. 3). For example, when a first cycle duration is 20 hours, the battery cell is typically maintained at threshold electrical potential for between 2-18 hours (e.g., where during the preceding 2-18 hours of the first cycle charging duration, electrical potentials below the threshold are applied). The threshold electrical potential is at least equal to and preferably exceeds an open circuit voltage (for the target operating conditions such as the operating conditions of S400, for the first charge or discharge operating conditions, etc.) of the battery cell.

The threshold electrical potential is typically battery cell dependent (e.g., different threshold electrical potentials can be applied to each cell in a battery pack and/or module). However, the same threshold electrical potential can be used for each battery cell in a battery pack and/or module.

The threshold electrical potential preferably exceeds the open circuit voltage of a major capacity contributing electrochemical reaction (e.g., contributing greater than about 10% of the total theoretical capacity of the battery cell) by greater than 100 mV (e.g., 110 mV, 120 mV, 140 mV, 150 mV, 160 mV, 180 mV, 200 mV, 220 mV, 225 mV, 230 mV, 240 mV, 250 mV, 260 mV, 275 mV, 280 mV, 300 mV, 315 mV, 320 mV, 350 mV, 400 mV, 450 mV, 500 mV, 550 mV, 600 mV, 700 mV, 750 mv, 1000 mV, values or ranges therebetween, etc.). As shown for example in FIG. 5, diminishing returns can be observed for exceeding the OCV by significant amounts. The threshold electrical potential can be critical for improving performance of the battery cell. For instance, a battery capacity resulting from charging a Na—$FeCl_2$ battery cell up to a threshold electrical potential of 2.58 V (corresponding to an overpotential, i.e., a difference in potential between the threshold electrical potential or charging electrical potential and the open circuit voltage of 230 mV relative to the OCV of the NaCl+½ Fe↔Na+$FeCl_2$ reaction) can be about 3% less than the battery capacity resulting from charging an identical Na—$FeCl_2$ battery cell up to a threshold electrical potential of 2.68 V (corresponding to an overpotential of 330 mV), but about 78% greater than the battery capacity resulting from charging an identical Na—$FeCl_2$ battery cell up to a threshold electrical potential of 2.46 V (corresponding to an overpotential of 110 mV). In this example, the Na—$FeCl_2$ battery cell resistance (e.g., measured during a subsequent discharge cycle) can be about 31% and 41% greater, for a battery charged up to a threshold electrical potential of 330 mV and 110 mV respectively, than the battery resistance for a battery charged up to a threshold electrical potential of 230 mV. Different critical threshold electrical potentials can result from different battery chemistries, different material sources (e.g., metal particles with different exposed surface area and/or enclosed surface area), combinations of material(s) (e.g., a metal mixture of iron and nickel can have a different threshold electrical potential depending on the relative ratio of nickel to iron, different metals can have different threshold electrical potentials, etc.), and/or the critical threshold electrical potential can otherwise vary. However, any suitable overcharge potential can be used and/or can result in any suitable battery properties.

S200 preferably includes maintaining the battery at a first cycle charging temperature for a first cycle charging time. The first cycle charging temperature preferably exceeds the normal operating temperature of the battery (e.g., the temperature during the first cycle is greater than the temperature of the battery during subsequent charging and discharging cycles). The first cycle charging temperature can depend on the battery chemistry (e.g., a different first cycle charging temperature can be used for nickel, iron, etc.), overpotential, target battery capacity and/or normalized battery capacity (e.g., normalized to a given surface area of active material, solid electrolyte, etc.; normalized to a given mass of active material, solid electrolyte, etc.; etc.), target battery resistance (e.g., normalized to a given surface area of active material, solid electrolyte, etc.; normalized to a given mass of active material, solid electrolyte, etc.; etc.), wetting of active material (e.g., wetting solid electrolyte with active material such as molten anode material, secondary electrolyte, etc.), and/or can depend on any suitable property(s) of the battery. Higher temperatures typically result in more favorable wetting performance (e.g., better wetting of BASE by molten sodium or anode material), but can result in undesirable side reactions (e.g., formation of undesirable phases, formation of halogens, dissolution of active materials, degradation of the BASE, etc.). Higher temperatures is a relative term that depends on the active materials (e.g., for iron a threshold temperature might be considered about 200° C., for nickel a high temperature might be considered about 400° C., etc.). The inventors have found that over the duration of the first cycle, the use of higher temperatures (e.g., temperatures exceeding the threshold temperature) overall results in favorable battery properties (e.g., lowered resistance, increased capacity, etc.) without significant degradation.

The first cycle charging temperature is preferably at least 200° C. For example, the first cycle charging temperature can be 225° C., 230° C., 250° C., 260° C., 270° C., 275° C., 280° C., 290° C., 300° C., 310° C., 315° C., 320° C., 325° C., 330° C., 340° C., 350° C., 360° C., 375° C., 380° C., 390° C., 400° C., values or ranges therebetween, and/or other suitable temperature(s).

The first cycle duration can be fixed (e.g., constant) and/or vary (e.g., be dynamically set based on one or more sensor readings or diagnostics of the battery during the charging time). The first cycle duration is typically greater than about 10 hours (e.g., 12 hours, 14 hours, 15 hours, 16 hours, 18 hours, 20 hours, 24 hours, 28 hours, 32 hours, 36 hours, 40 hours, 42 hours, 46 hours, 48 hours, 60 hours, 72 hours, etc.). However, the first cycle duration could be less than 10 hours (e.g., with a suitably high C rate). The C rate during the first charge is preferably low (e.g., less than 1 C such as C/2, C/5, C/8, C/10, C/12, C/15, C/18, C/20, C/24, etc.). However, during the first charge, the C rate can be high (e.g., greater than 1 C) and/or equal to 1 C.

The first cycle charging temperature is preferably maintained for a full duration of a first cycle (e.g., for the entirety of S200, the first cycle duration). However, additionally or alternatively, the first cycle charging temperature can be maintained for a portion of the first cycle (e.g., where thereafter the battery can be force cooled or spontaneously cool to a lower temperature, where thereafter the temperature can be further increased, etc.). For instance, the first cycling temperature can begin at a higher temperature (e.g., 325° C., 300° C., 275° C., 250° C., 200° C., or ranges or values therebetween, etc.) for a first time (e.g., 1 hours, 2 hours, 4 hours, 6 hours, 8 hours, 10 hours, etc.) before lowering to a second lower temperature (e.g., 300° C., 275° C., 250° C., 200° C., 190° C., 180° C., 170° C., or ranges or values therebetween etc.) for a remainder of the first cycle time. Additionally or alternatively, other (potentially more complex) temperature profiles (e.g., with temperature increases and/or decreases) can be used.

The first cycle overpotential (e.g., relative to a major capacity contributing electrochemical reaction) is preferably maintained for a portion of the first cycle (e.g., where therebefore or thereafter the battery can be held at a higher or lower overpotential). For instance, the first cycling overpotential can begin at a lower overpotential (e.g., 330 mV, 320 mV, 300 mV, 280 mV, 275 mV, 260 mV, 250 mV, 230 mV, 220 mV, 200 mV, 180 mV, 175 mV, 160 mV, 150 mV, 125 mV, 100 mV, 50 mV, 10 mV, or ranges or values therebetween, etc.) and/or no overpotential for a first time (e.g., 1 hours, 2 hours, 4 hours, 6 hours, 8 hours, 10 hours, etc.) before raising to a second overpotential (e.g., 350 mV, 330 mV, 320 mV, 300 mV, 280 mV, 275 mV, 260 mV, 250 mV, 230 mV, 220 mV, 200 mV, 180 mV, 175 mV, 160 mV, 150 mV, or ranges or values therebetween etc.) for a remainder of the first cycle time. However, additionally or alternatively, the first cycle overpotential can be maintained for a full duration of a first cycle (e.g., for the entirety of S200, the first cycle duration). Additionally or alternatively, other (potentially more complex) overpotential profiles (e.g., with overpotential increases and/or decreases) can be used.

The overpotential and temperature are preferably maintained simultaneously (e.g., whenever a high overpotential is maintained, a high temperature is maintained as well). However, the overpotential and temperature can be staggered, unrelated to one another, and/or have any suitable overlap (including no overlap between high temperature and high overpotential).

Applying a first discharge to the battery S300 functions to release the energy stored in the battery. The first discharge is typically performed in conditions that are different from subsequent discharging, which can be beneficial for equilibrating the battery. However, in some variants the first discharge can be performed in the same conditions as subsequent discharging steps (e.g., S300 can be subsumed by or part of S400 in some variants).

S300 is preferably performed at a higher rate than subsequent discharging. For instance, S300 can be performed at a C rate C/2, C/4, C/8, C/10, C/12, C/16, C/20, C/24, C/30, C/45, C/50, and/or at C rates in between or less than C/50. Typically S300 is performed at a fixed C rate. However, the C rate can vary in S300.

S300 preferably includes maintaining the battery at a first cycle discharging temperature for a first cycle discharging time. The first cycle discharging temperature preferably exceeds the normal operating temperature of the battery (e.g., the temperature during the first discharge is greater than the temperature of the battery during subsequent cycles). The first cycle discharging temperature is preferably less than the first cycle charging temperature. However, the first cycle discharging temperature can be the same as and/or greater than the first cycle charging temperature. Alternatively, in some variants the first discharging temperature can be the same as the temperature in subsequent discharging steps (e.g., S300 can be subsumed by or part of S400 in some variants). The first cycle discharging temperature can depend on the battery chemistry (e.g., a different first cycle charging temperature can be used for nickel, iron, etc.), overpotential, target battery capacity and/or normalized battery capacity (e.g., normalized to a given surface area of active material, solid electrolyte, etc.; normalized to a given mass of active material, solid electrolyte, etc.; etc.), target battery resistance (e.g., normalized to a given surface area of active material, solid electrolyte, etc.; normalized to a given mass of active material, solid electrolyte, etc.; etc.), wetting of active material (e.g., wetting solid electrolyte with active material such as molten anode material, secondary electrolyte, etc.), and/or can depend on any suitable property(s) of the battery.

The first cycle discharging temperature is preferably at least 180° C. For example, the first cycle discharging temperature can be 185° C., 190° C., 200° C., 210° C., 220° C., 230° C., 250° C., 260° C., 270° C., 275° C., 280° C., 290° C., 300° C., 310° C., 315° C., 320° C., 325° C., 330° C., 340° C., 350° C., 360° C., 375° C., 380° C., 390° C., 400° C., values or ranges therebetween, and/or other suitable temperature(s).

The first discharge duration can be fixed (e.g., constant) and/or vary (e.g., by dynamically set based on one or more sensor readings or diagnostics of the battery during the charging time). The first discharge duration is typically shorter than the first charge cycle duration (e.g., S300 is typically shorter than S200). The first discharge duration is typically shorter than about 20 hours (e.g., 1 hour, 2 hours, 4 hours, 6 hours, 8 hours, 10 hours, 12 hours, 14 hours, 15 hours, 16 hours, 18 hours, etc.). However, the first discharge cycle can depend on the C rate, target depth of discharge, target state of charge, and/or other suitable battery property.

The first cycle discharging temperature is preferably maintained for a full duration of a first discharge (e.g., for the entirety of S200, the first cycle duration). However, additionally or alternatively, the first cycle discharge temperature can be maintained for a portion of the first discharge (e.g., where thereafter the battery can be force cooled or spontaneously cool to a lower temperature, where thereafter the temperature can be further increased, etc.). For instance, the first discharge temperature can begin at a higher temperature (e.g., 325° C., 300° C., 280° C., 275° C., 250° C., 200° C., or ranges or values therebetween, etc.) for a first time (e.g., 1 hours, 2 hours, 4 hours, 6 hours, 8 hours, 10 hours, etc.) before lowering to a second lower temperature (e.g., 300° C., 275° C., 250° C., 200° C., 190° C., 180° C., 170° C., or ranges or values therebetween etc.) for a remainder of the first discharge time. Additionally or alternatively, other (potentially more complex) temperature profiles (e.g., with temperature increases and/or decreases) can be used.

Cycling the battery (e.g., through charge and discharge cycles) S400 functions to store and release the stored electrical energy within the battery. The energy is preferably stored and released over relatively long-time scales (e.g., used for grid energy storage, back-up power supply, generator, etc. such as multiple hours or days). However, the energy can be stored and/or released in bursts and/or short time scales (e.g., less than about 1 hour). As an illustrative example, the energy can be stored and released over a 2-12 hours timescale (e.g., charged during daytime, when excess renewable energy is available, etc. and discharged overnight, when excess renewable energy is not available, etc.). However, the battery can be used in any manner (e.g., for electric vehicle applications). S400 can be performed iteratively (e.g., batteries are continuously being charged and/or discharged), intermittently (e.g., batteries are charged and/or discharged on demand), and/or with any suitable timing.

Typically, charging and discharging cycles after the first charging and discharging cycle are performed in substantially the same conditions (e.g., same rates, same overpotential, same temperature, etc.) for varying lengths of time (e.g., based on when energy is needed, when energy is available to recharge the battery, etc.). However, different conditions can be used for different cycles (e.g., the second cycle can be different from subsequent cycles, the second and third cycles can be different from subsequent cycles, etc.). For instance (as shown for example in FIG. 3), the second charging cycle (optionally including the second discharge as well) can be performed at different conditions than subsequent charging cycles. For example, the second charge can be performed at a temperature intermediate between a first cycle temperature and subsequent cycles (e.g., a second cycle temperature could be about 280° C. and subsequent cycle temperatures could be about 250° C. however, other temperature values as described above can alternatively be used for each cycle). As another example, the second charge can be performed with an overpotential intermediate between a first cycle overpotential and subsequent cycles (e.g., a second cycle overpotential could be about 150 mV and subsequent cycle temperatures could be about 110 mV however, other overpotentials values as described above can alternatively be used for each cycle).

Cycling the battery preferably includes charging the battery with an overpotential (e.g., cycling overpotential) that is less than the first cycle overpotential (e.g., first overpotential). The cycling overpotential is typically less than the first overpotential to minimize and/or slow degradation of the battery from an excess overpotential. The cycling overpotential is typically at most 110 mV (including 0 mV or no overpotential). In some variants, an underpotential could be applied (e.g., a negative overpotential) such as when complete charging is undesirable, for battery cell balancing between battery cells, and/or in other conditions.

The cycling temperature (for both discharging and charging) is preferably about 250° C. (e.g., 230-270° C.), particularly for cells that use iron as the primary or sole electroreactive cathode metal. However, lower temperatures can be used (e.g., as long as the anode active material and/or secondary electrolyte are molten at the cycling temperature) and/or higher temperatures (e.g., values or ranges between 200 and 300° C.) can be used (e.g., for different battery chemistries such as sodium-nickel chloride batteries).

In some variants, the cycling temperature can be reduced below the cycling temperature (e.g., operation temperature). In these variants, reducing the temperature can result in solidification of one or more battery components. Thus, the battery is effectively locked in a particular charge state until the temperature is raised (and the system equilibrated at) the operation temperature. In some variations of these variants, S200 (and S300) can be repeated upon restarting the battery. However, the battery can be restarted by placing the battery in the operation conditions of S400 and/or can otherwise be restarted.

As an illustrative example, a second charging cycle can be performed using a second cycle overpotential between 100 and 350 mV at a second charging temperature between 250° C. and 300° C. for a duration between 4 and 48 hours (e.g., 4 hours, 6 hours, 10 hours, 12 hours, 16 hours, 20 hours, 24 hours, 30 hours, 36 hours, 40 hours, etc. or other values therebetween). Subsequent charging cycles can be performed using a cycling overpotential between 0 and 200 mV at a charging temperature between about 150° C. and 280° C. for a duration between 1 and 24 hours. Discharging cycles (e.g., second and subsequent discharging cycles) can be performed at a temperature between 150° C. and 280° C. (e.g., approximately the same temperature as charging cycles) at a discharge capacity between 0.1 and 500 amperehours (Ah) (e.g., 0.2 Ah, 0.5 Ah, 0.75 Ah, 1 Ah, 1.1 Ah, 1.2 Ah, 1.5 Ah, 1.7 Ah, 2 Ah, 2.25 Ah, 2.5 Ah, 3 Ah, 4 Ah, 5 Ah, 6 Ah, 7 Ah, 8 Ah, 9 Ah, 10 Ah, 15 Ah, 20 Ah, 25 Ah, 50 Ah, 75 Ah, 100 Ah, 125 Ah, 150 Ah, 175 Ah, 200 Ah, 225 Ah, 250 Ah, 275 Ah, 300 Ah, 350 Ah, 400 Ah, 450 Ah, 500 Ah, values or ranges therebetween, etc.) to an electrical potential between 1 V and 2.35 V (e.g., 1.1 V, 1.2 V, 1.3 V, 1.4 V, 1.5 V, 1.6 V, 1.7 V, 1.8 V, 1.9 V, 2 V, 2.1 V, 2.15 V, 2.2 V, 2.3 V, 2.35 V, etc.) at a C rate between C/2 and C/50. However, the battery can be charged and/or discharged to any suitable value(s).

SPECIFIC EXAMPLES

Specific Example 1: In specific example 1, a method for cycling a Na—FeCl$_2$ battery cell comprises: prior to a first charging cycle, loading a mixture comprising sodium chloride, secondary electrolyte, and iron particles into a cathode chamber of the Na—FeCl$_2$ battery cell; during the first charging cycle: heating the Na—FeCl$_2$ mixture battery cell to an average first charging cycle temperature for a duration of the first charging cycle; and applying an over potential to the Na—FeCl$_2$ battery cell that exceeds an open circuit voltage of the Na—FeCl$_2$ battery cell by at least 150 mV; during a first discharging cycle after the first charging cycle, wherein a duration of the first discharging cycle is less than the duration of the first charging cycle: maintaining the Na—FeCl$_2$ battery cell at an average first discharging cycle temperature that is less than the average first charging cycle temperature; during subsequent charging cycles and subsequent discharging cycles maintaining the Na—FeCl$_2$ battery cell at an average steady-state temperature that is less than or equal to the average first discharging cycle temperature; and during subsequent charging cycles, applying an overpotential that at most exceeds the open circuit voltage of the Na—FeCl$_2$ battery cell by 110 mV. In some variations of Specific example 1, a duration of the subsequent charging cycles is shorter than the duration of the first charging cycle, and wherein a duration of the subsequent discharging cycles is less than the duration of the first discharging cycle.

Specific example 2: The method of Specific Example 1, wherein the iron particles comprise an exposed surface area less than about 0.5 m$^2$/g.

Specific example 3: The method of Specific example 1 or 2, wherein the iron particles comprise carbonyl iron powder or reduced iron powder.

Specific example 4: The method of Specific example 1, 2, or 3, wherein the average first cycle temperature is greater than 300° C., wherein the average first discharging cycle temperature is at most 300° C., wherein the average steady-state temperature is between about 190-285° C.

Specific example 5. The method of specific example 1, 2, 3, or 4 wherein the first charge overpotential comprises an electrical potential between 2.5 and 2.6 V.

Specific example 6. The method of Specific example 1, 2, 3, 4, or 5 wherein the mixture further comprises nickel particles, wherein a ratio of nickel particles to iron particles is at most 1:3 on an atomic basis.

Specific example 7. The method of specific example 1, 2, 3, 4, 5, or 6, wherein the secondary electrolyte comprises at least one of sodium aluminium chloride, sodium aluminium bromide, sodium aluminium iodide, or sodium aluminium ethyl chloride.

Specific example 8. The method of Specific Example 1, 2, 3, 4, 5, 6, or 7, wherein the cathode chamber is separated from an anode chamber by a solid electrolyte comprising β-alumina or β"-alumina.

Specific example 9. The method of Specific Example 1, 2, 3, 4, 5, 6, 7, or 8, wherein the duration of the first charging cycle is at least 15 hours, wherein the Na—FeCl$_2$ battery cell experiences the overpotential during the first charging cycle is at most about half of the duration of the first charging cycle (e.g., 7.5 hours, 5 hours, 4 hours, 3 hours, etc.), wherein the duration of the first discharging cycle is at most about 10 hours, wherein the duration of subsequent charging cycles is at most about 12 hours, and wherein the duration of subsequent discharging cycles is at most about 10 hours.

Specific example 10. A method for preparing a metal conversion battery cell (e.g., Na—FeCl$_2$ battery cell) comprising: loading a mixture comprising an anode precursor (e.g., alkali metal salt, sodium chloride, etc.) and metal particles (e.g., iron, nickel, etc.) into a cathode chamber of the metal conversion battery cell, wherein the cathode chamber is separated from an anode chamber by a solid electrolyte; applying an electrical potential of at least 150 mV above an open circuit voltage of the metal conversion battery cell to the metal conversion battery cell; wherein during subsequent charging cycles an overpotential applied to the metal conversion battery cell is at most 110 mV.

Specific example 11. The method of Specific example 10, wherein the metal particles comprise iron particles and nickel particles, wherein a ratio of nickel to iron is at most 1:3 on an elemental mole ratio.

Specific example 12. The method of Specific example 10 or 11, wherein the metal particles (e.g., the iron particles) comprise an exposed (e.g., measured without further modification) surface area less than about 0.5 m$^2$/g.

Specific example 13. The method of Specific example 10, 11, or 12 wherein the metal particles comprise carbonyl metal powder or reduced metal powder.

Specific example 14. The method of Specific example 10, 11, 12, or 13 wherein the mixture further comprises a secondary electrolyte loaded in the cathode chamber selected from the group consisting of sodium aluminium chloride, sodium aluminium bromide, sodium aluminium iodide, sodium aluminium ethyl chloride, and combinations thereof.

Specific example 15. The method of Specific example 10, 11, 12, 13, or 14, wherein the solid electrolyte comprises β-alumina or β"-alumina.

Specific example 16. The method of Specific example 10, 11, 12, 13, 14, or 15, wherein the metal conversion battery cell comprises a charge capacity of at least 0.04 milli-amp hour/(cm$^2$ of initial exposed metal surface area) after the first charging cycle.

Specific example 17. The method of Specific example 10, 11, 12, 13, 14, 15, or 16, wherein the metal conversion battery cell comprises a resistance (e.g., an average of the C/16.7 DC resistance at 1.5 Ah discharge and 5 Ah discharge, after a complete full charge) of at most 17 kilo-ohm-(cm$^2$ of initial exposed metal surface area) after a discharging cycle.

Specific example 18. The method of Specific example 10, 11, 12, 13, 14, 15, 16, or 17, wherein the metal conversion battery cell comprises a charge capacity of at least 0.27 amp hour/(g of metal) after the first charging cycle.

Specific example 19. The method of Specific example 10, 11, 12, 13, 14, 15, 16, 17, or 18, wherein the metal conversion battery cell comprises a resistance (e.g., an average of the C/16.7 DC resistance at 1.5 Ah discharge and 5 Ah discharge, after a complete full charge) of at most 10 ohm-(cm$^2$ β-alumina solid electrolyte (BASE) surface area) after a discharging cycle.

Specific example 20. The method of Specific example 10, 11, 12, 13, 14, 15, 16, 17, 18, or 19, further comprising contemporaneously with applying the electric potential, maintaining the metal conversion battery cell at an average temperature greater than about 300° C.

Specific example 21. The method of Specific example 20 further comprising a first discharging cycle comprising discharging the metal conversion battery cell at an average temperature less than 300° C. for between 2 and 10 hours at about C/6.25.

Specific example 22. The method of Specific example 21, further comprising a second charging cycle comprising charging the metal conversion battery cell at a temperature less than 300° C. to at most about 110 mV above the open circuit voltage of the metal conversion battery cell at about C/18.

Specific example 23. The method of Specific example 19, further comprising a second discharging cycle comprising discharging the metal conversion battery cell at an average temperature between 190 and 285° C. to about 1.8 V at about C/16.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, and/or FPGA/ASIC. However, the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the preceding system and/or method can be used with, in addition to, in lieu of, or otherwise integrated with all or a portion of the systems and/or methods disclosed in the applications mentioned above, each of which are incorporated in their entirety by this reference.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30% of a reference), or be otherwise interpreted.

As a person skilled in the art will recognize from the previous detailed description and from the figures and claims, modifications and changes can be made to the preferred embodiments of the invention without departing from the scope of this invention defined in the following claims.

We claim:

1. A method for cycling a Na—$FeCl_2$ battery cell comprising:
   prior to a first charging cycle, loading a mixture comprising sodium chloride, secondary electrolyte, and iron particles into a cathode chamber of the Na—$FeCl_2$ battery cell;
   during the first charging cycle:
      heating the Na—$FeCl_2$ battery cell to an average first charging cycle temperature for a duration of the first charging cycle; and
      applying an over potential to the Na—$FeCl_2$ battery cell during the first charging cycle that exceeds an open circuit voltage of the Na—$FeCl_2$ battery cell at the first charging cycle temperature by at least 150 mV;
   during a first discharging cycle after the first charging cycle, wherein a duration of the first discharging cycle is less than the duration of the first charging cycle:
      maintaining the Na—$FeCl_2$ battery cell at an average first discharging cycle temperature that is less than the average first charging cycle temperature;
   during subsequent charging cycles and subsequent discharging cycle maintaining the Na—$FeCl_2$ battery cell at an average steady-state temperature that is less than or equal to the first discharging cycle temperature; and
   during subsequent charging cycles, applying an overpotential that at most exceeds the open circuit voltage of the Na—$FeCl_2$ battery cell by 110 mV.

2. The method of claim 1, wherein the iron particles comprise an exposed surface area less than about 0.5 $m^2/g$.

3. The method of claim 1, wherein the iron particles comprise carbonyl iron powder or reduced iron powder.

4. The method of claim 1, wherein the average first cycle temperature is greater than 300° C., wherein the average first discharging cycle temperature is at most 300° C., wherein the average steady-state temperature is between about 190-285° C.

5. The method of claim 1, wherein the first charge overpotential comprises an electrical potential between 2.50 and 2.6 V.

6. The method of claim 1, wherein the mixture further comprises nickel particles, wherein a ratio of nickel particles to iron particles is at most 1:3 on an atomic basis.

7. The method of claim 1, wherein the secondary electrolyte comprises at least one of sodium aluminium chloride, sodium aluminium bromide, sodium aluminium iodide, or sodium aluminium ethyl chloride.

8. The method of claim 1, wherein the cathode chamber is separated from an anode chamber by a solid electrolyte comprising β-alumina or β"-alumina.

9. The method of claim 1, wherein the duration of the first charging cycle is at least 15 hours, wherein a duration the Na—$FeCl_2$ battery cell experiences the overpotential during the first charging cycle is at most about half of the duration of the first charging cycle, wherein the duration of the first discharging cycle is at most about 10 hours, wherein the duration of subsequent charging cycles is at most about 12 hours, and wherein the duration of subsequent discharging cycles is at most about 10 hours.

10. A method for preparing a Na—$FeCl_2$ battery cell comprising:
   loading a mixture comprising sodium chloride and iron particles into a cathode chamber of the Na—$FeCl_2$ battery cell, wherein the cathode chamber is separated from an anode chamber by a solid electrolyte; and
   during a charging cycle, applying an electrical potential of at least 150 mV above an open circuit voltage of the Na—$FeCl_2$ battery cell to the Na—$FeCl_2$ battery cell;
   wherein during subsequent charging cycles an overpotential is at most 110 mV.

11. The method of claim 10, wherein the mixture further comprises nickel particles, wherein a ratio of nickel to iron is at most 1:3 on an elemental mole ratio.

12. The method of claim 10, wherein the iron particles comprise an exposed surface area less than about 0.5 $m^2/g$.

13. The method of claim 10, wherein the iron particles comprise carbonyl iron powder or reduced iron powder.

14. The method of claim 10, wherein the mixture further comprises a secondary electrolyte loaded in the cathode chamber selected from the group consisting of sodium aluminium chloride, sodium aluminium bromide, sodium aluminium iodide, sodium aluminium ethyl chloride, and combinations thereof.

15. The method of claim 10, wherein the solid electrolyte comprises β-alumina or β"-alumina.

16. The method of claim 10, wherein the Na—$FeCl_2$ battery cell comprises a charge capacity of at least 0.05 milliamp hour/($cm^2$ of initial exposed iron surface area) after the first charging cycle.

17. The method of claim 10, wherein the Na—$FeCl_2$ battery cell comprises a charge capacity of at least 0.27 amp hour/(g of iron) after the first charging cycle.

18. The method of claim 10, wherein the Na—$FeCl_2$ battery cell comprises a resistance of at most 17 kilo-ohm-($cm^2$ initial exposed iron surface area) after a discharging cycle.

19. The method of claim 10, wherein the Na—FeCl$_2$ battery cell comprises a resistance of at most 10 ohm-(cm$^2$ β-alumina solid electrolyte (BASE) surface area) after a discharging cycle.

20. The method of claim 10, further comprising contemporaneously with applying the electric potential, maintaining the Na—FeCl$_2$ battery cell at an average temperature greater than about 300° C.

21. The method of claim 20, further comprising a first discharging cycle comprising discharging the Na—FeCl$_2$ battery cell at a temperature less than 300° C. for between 2 and 10 hours at about C/6.25.

22. The method of claim 21, further comprising a second charging cycle comprising charging the Na—FeCl$_2$ battery cell at a temperature less than 300° C. to at most about 110 mV above the open circuit voltage of the Na—FeCl$_2$ battery cell at about C/18.

23. The method of claim 22, further comprising a second discharging cycle comprising discharging the Na—FeCl$_2$ battery cell at a temperature between 190 and 285° C. to about 1.8 V at about C/16.

\* \* \* \* \*

UNITED STATES PATENT AND TRADEMARK OFFICE
CERTIFICATE OF CORRECTION

| | | |
|---|---|---|
| PATENT NO. | : 12,166,187 B1 | Page 1 of 1 |
| APPLICATION NO. | : 18/629518 | |
| DATED | : December 10, 2024 | |
| INVENTOR(S) | : William Gent et al. | |

It is certified that error appears in the above-identified patent and that said Letters Patent is hereby corrected as shown below:

On the Title Page

Column 1, Item (54) Title, Line 5, After "THEREFROM", delete "PRELIMINARY CLASS"

In the Specification

Column 1, Title, Line 5, After "THEREFROM", delete "PRELIMINARY CLASS"

Signed and Sealed this
Fourth Day of February, 2025

Coke Morgan Stewart
*Acting Director of the United States Patent and Trademark Office*